(12) United States Patent
Uchiyama et al.

(10) Patent No.: US 8,687,354 B2
(45) Date of Patent: Apr. 1, 2014

(54) DUAL SHAFT HINGE WITH ANGLE TIMING SHAFT MECHANISM

(75) Inventors: Yoshiharu Uchiyama, Kanagawa-ken (JP); Kenshin Yonemochi, Kanagawa-ken (JP); Akinori Uchino, Kanagawa-ken (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 139 days.

(21) Appl. No.: 13/361,861

(22) Filed: Jan. 30, 2012

(65) Prior Publication Data

US 2013/0194741 A1    Aug. 1, 2013

(51) Int. Cl.
*G06F 1/16* (2006.01)

(52) U.S. Cl.
USPC .............. 361/679.27; 296/186.4; 248/461; 16/330

(58) Field of Classification Search
USPC .......... 248/551, 122.1, 316.1, 450, 464, 461, 248/462, 688; 296/192, 61, 66, 65.09, 296/186.4, 147; 362/253, 621, 97.1, 427, 362/191; 361/679.01, 679.07, 679.21, 361/679.4, 679.56, 679.41, 679.49, 679.27, 361/679.02, 679.08, 679.26, 679.06; 16/367, 297, 250, 241, 382, 319, 338, 16/330, 221, 303, 285, 366; 455/575.3, 455/575.1, 566, 550.1
See application file for complete search history.

(56) References Cited

U.S. PATENT DOCUMENTS

| | | |
|---|---|---|
| 5,666,694 A | 9/1997 | Slow et al. |
| 6,154,359 A | 11/2000 | Kamikakai et al. |
| 6,492,974 B1 | 12/2002 | Nobuchi et al. |
| 2005/0236869 A1* | 10/2005 | Ka et al. .................. 296/192 |
| 2012/0147535 A1* | 6/2012 | Ahn et al. ............. 361/679.01 |
| 2013/0003278 A1* | 1/2013 | Hayashi et al. ........ 361/679.07 |

* cited by examiner

*Primary Examiner* — Hung Duong
(74) *Attorney, Agent, or Firm* — Shimokaji & Assoc., PC (57) ABSTRACT

A hinge is provided that permits a user to use a computer system either as a laptop computer or a tablet computer. The hinge may comprise a hinge block and an inhibitor stopper. The hinge block may have a first hinge member and a second hinge member. The inhibitor stopper may be disposed between the first hinge member and the second hinge member. The inhibitor stopper may have a first wing and a second wing. The inhibitor stopper may be attached to the hinge block. The first and second wings may be rotatable around an axis.

11 Claims, 7 Drawing Sheets

DUAL SHAFT HINGE WITH ANGLE TIMING SHAFT MECHANISM

BACKGROUND OF THE INVENTION

The present invention relates generally to computer systems and, more specifically, to tablet computers with hinges having dual shafts which operate to pivot a display housing relative to a base housing synchronically.

In recent years, portable computers have evolved from transportable suitcase style computers, to laptops or notebooks, and then to slate PCs (also referred to as "tablets" or "pure tablets"). Tablet computers have many advantages not found in standard desktop or notebook computers. Chief among these advantages is usually the ability to interface with the tablet computer by writing on or tapping a touch screen display using a stylus or other implement. Input to the computer may thus be entered in a manner similar to writing on paper rather than using a keyboard.

Sometimes, the existing convertible computers which have keyboards may have one hinge or two hinges to connect an upper housing and a lower housing. After the upper housing being open for many times, the convertible computer having two hinges may become wobbly and two hinges may not help the upper housing to rotate relative to the lower housing synchronously.

Therefore, it can be seen that there is a need for a tablet computer with an improved hinge.

SUMMARY

In one aspect, a computer system comprises a hinge block having a first hinge member and a second hinge member; and an inhibitor stopper disposed between the first hinge member and the second hinge member, wherein the inhibitor stopper has an axis, a first wing and a second wing, wherein the inhibitor stopper is attached to the hinge block, and wherein the first and second wings are rotatable around the axis.

In another aspect, an electronic computing device comprises a lower housing; an upper housing; and a plurality of hinge blocks attached to confronting edge portions of the lower housing and the upper housing, wherein each of the hinge blocks has an inhibitor stopper, wherein the inhibitor stopper is operatively coupled to the lower housing and the upper housing in such a way that the upper housing is rotatable synchronously over substantially 360° with respect to the lower housing on the plurality of hinge blocks.

In a further aspect, a mobile computing device comprises a lower housing; an upper housing pivotally coupled to the lower housing for movement between a tablet configuration and a laptop configuration, wherein, in the tablet configuration, the lower housing is substantially parallel and adjacent to the upper housing; and a plurality of hinge blocks having a first hinge member and a second hinge member, wherein the upper housing pivots on the hinge blocks through a first range of motion, and the upper housing and the hinge blocks pivot on the second hinge members through a second range of motions.

These and other features, aspects and advantages of the present invention will become better understood with reference to the following drawings, description and claims.

DETAILED DESCRIPTION OF EMBODIMENTS

The following detailed description is of the best currently contemplated modes of carrying out exemplary embodiments. The description is not to be taken in a limiting sense, but is made merely for the purpose of illustrating the general principles, since the scope of the embodiments is best defined by the appended claims.

Various inventive features are described below that can each be used independently of one another or in combination with other features.

Broadly, exemplary embodiments comprise a tablet PC with hinges movable throughout multiple positions. More specifically, exemplary embodiments of a tablet PC may comprise one or more hinges movable through a plurality of positions; an input unit, such as a keyboard; and a display housing. According to exemplary embodiments, a plurality of hinges, such as two hinges, for example, may interconnect the input unit with the display housing. The hinges may include an inhibitor stopper and a hinge block. The hinge block may comprise a first hinge member and a second hinge member. The first hinge member and a second hinge member are adapted to connect to the display housing and the input unit, respectively. The inhibitor stopper may help the display housing to rotate relative to the input unit synchronously. The tablet PC may be configured in either a laptop configuration or a tablet configuration. In a laptop configuration, the computing system may be used as a regular laptop either on one's lap or on a desk, for example. In the tablet configuration, the display housing may be substantially parallel to and adjacent to the input unit of the computing system.

Referring to FIG. 1, a tablet personal computer (PC) 10 may include an upper housing 110, such as a display housing, and a lower housing 120, such as an input unit, for example, wherein the upper housing 110 and the lower housing 120 may be connected via a plurality of hinges 122. The tablet PC 10 may be a laptop computer system, such as one of the ThinkPad® series of personal computers sold by Lenovo (US) Inc. of Morrisville, N.C., or a workstation computer, such as the ThinkStation®, which is sold by Lenovo (US) Inc. of Morrisville, N.C. Exemplary embodiments may also include cell phones, smart phones, or electronic dictionaries, for example.

Figure 1A:
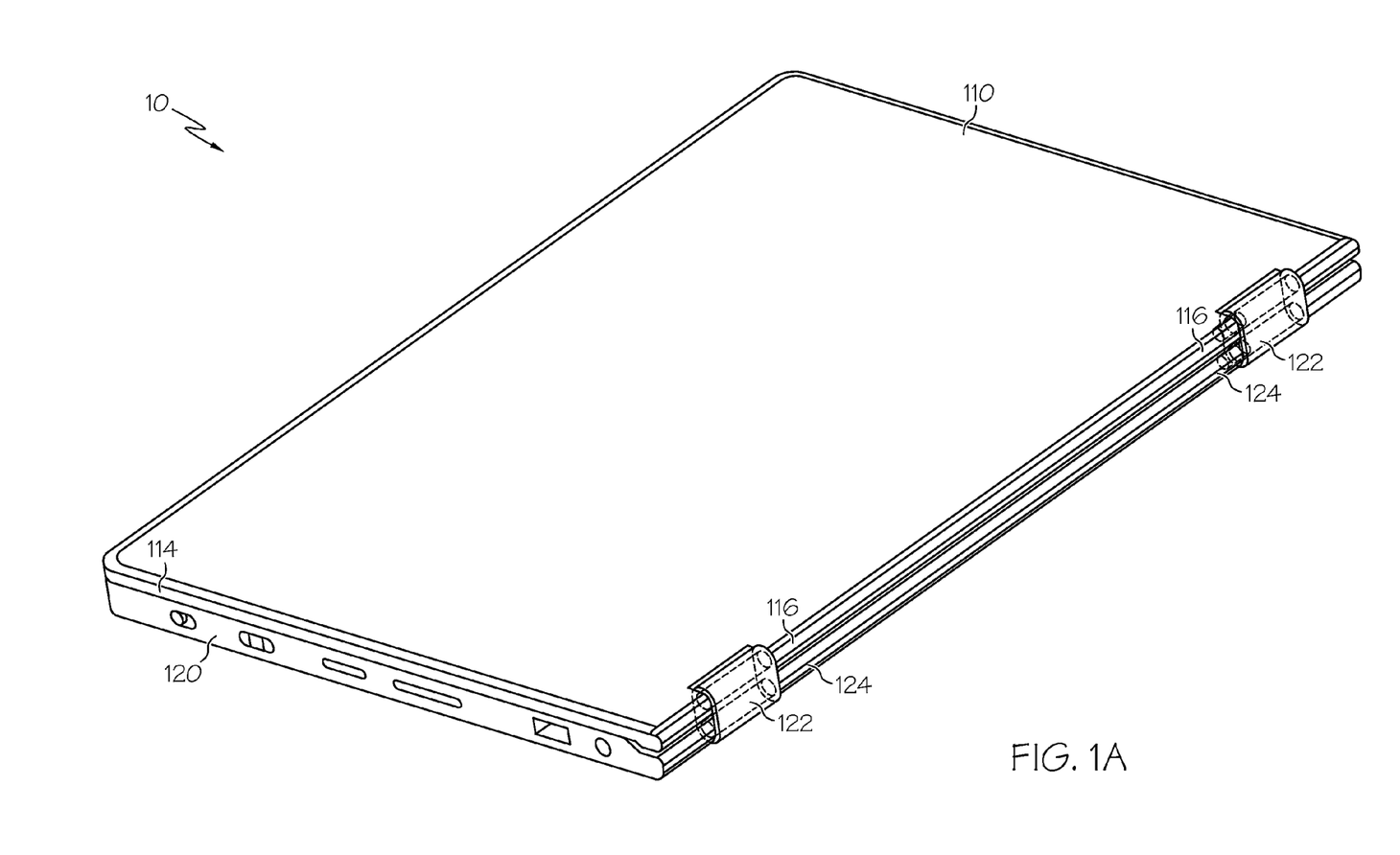
FIG. 1A is a perspective view of a tablet personal computer according to an exemplary embodiment in a closed position.

The notebook PC 10 may include a processor (not shown) within the lower housing 120. A liquid crystal display (LCD) 114, which may be a touch sensitive screen, for example, may be disposed in the upper housing 110. The LCD 114 may face the lower housing 120 when the notebook PC 10 is in a closed position, as shown in FIG. 1A. The touch sensitive screen 114 may be coupled to be operable by the processor to display data to a user of the notebook PC 10.

Each of the hinges 122 may be connected to a confronting edge portion 116 of the first housing 110 and a confronting edge portion 124 of the second housing 120. The upper housing 110 may pivot around the plurality of hinges 122 relative to the lower housing 120. The upper housing 110 may be rotatable through an angle of up to substantially 360° relative to the lower housing 120.

Figure 1B:
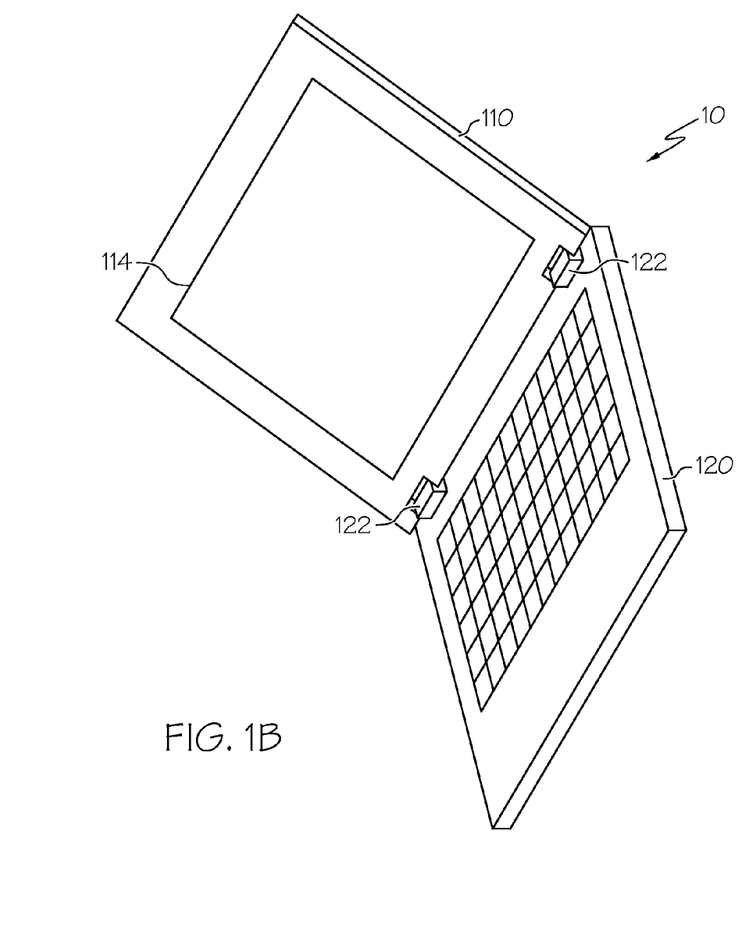
FIG. 1B is a perspective view of a tablet personal computer according to an exemplary embodiment configuration of FIG. 1A in an open position.
Figure 1C:
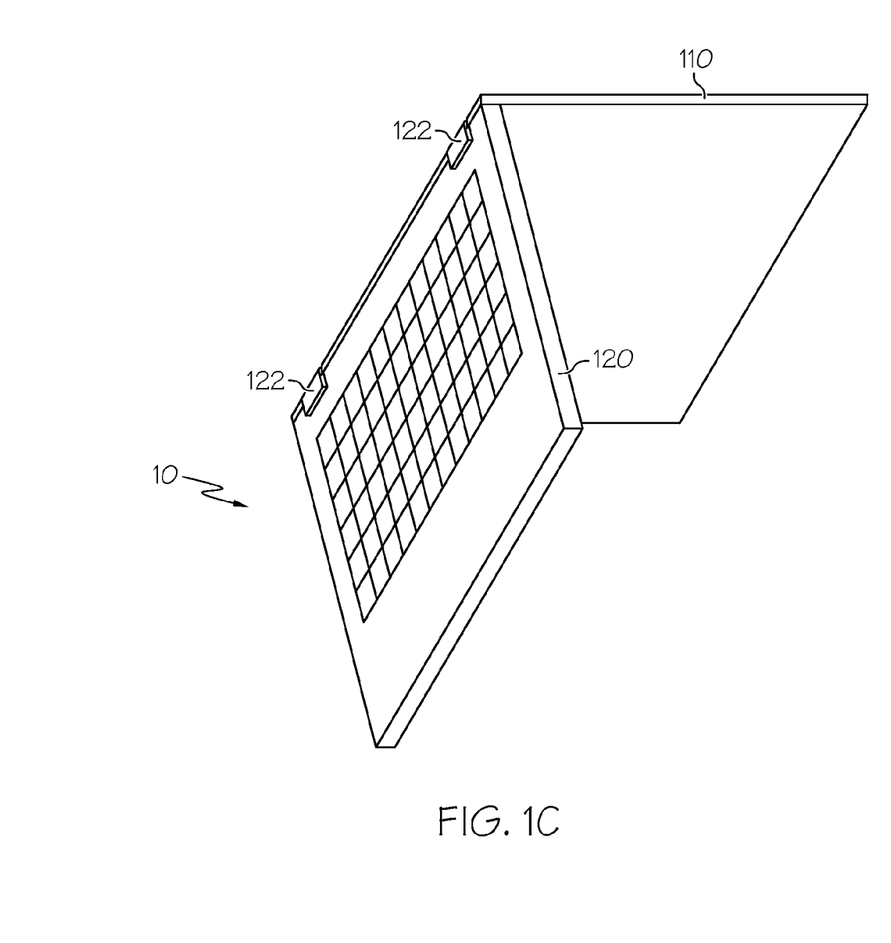
FIG. 1C is a perspective view of a tablet personal computer according to another exemplary embodiment configuration of FIG. 1A in an open position.
Figure 1D:
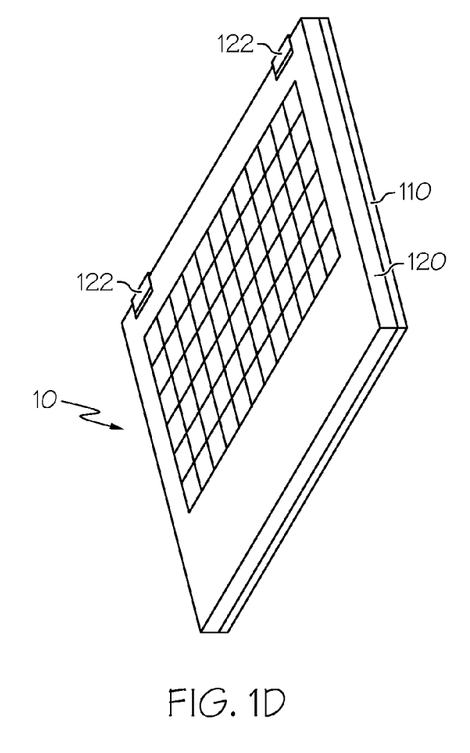
FIG. 1D is a perspective view of a tablet personal computer according to yet another exemplary embodiment configuration of FIG. 1A in an open position with a keyboard facing upward.
Figure 1E:
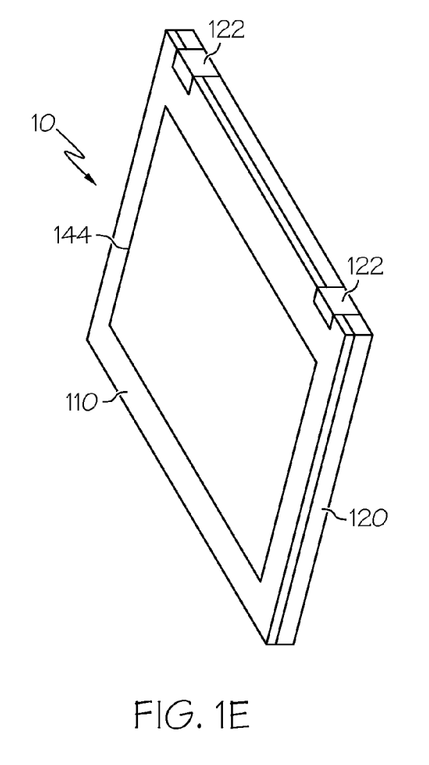
FIG. 1E is a perspective view of a tablet personal computer according to yet another exemplary embodiment configuration of FIG. 1A with the touch screen facing upward.

In operation of an exemplary embodiment, FIGS. 1B-1D show the upper housing 110 being opened at different angles comparable to the lower housing 120. FIG. 1E further illustrates the touch sensitive screen 114 facing upward. Users may write on or tap a touch screen display 114 using a stylus or other implement, such as a finger, for example.

Figure 2:
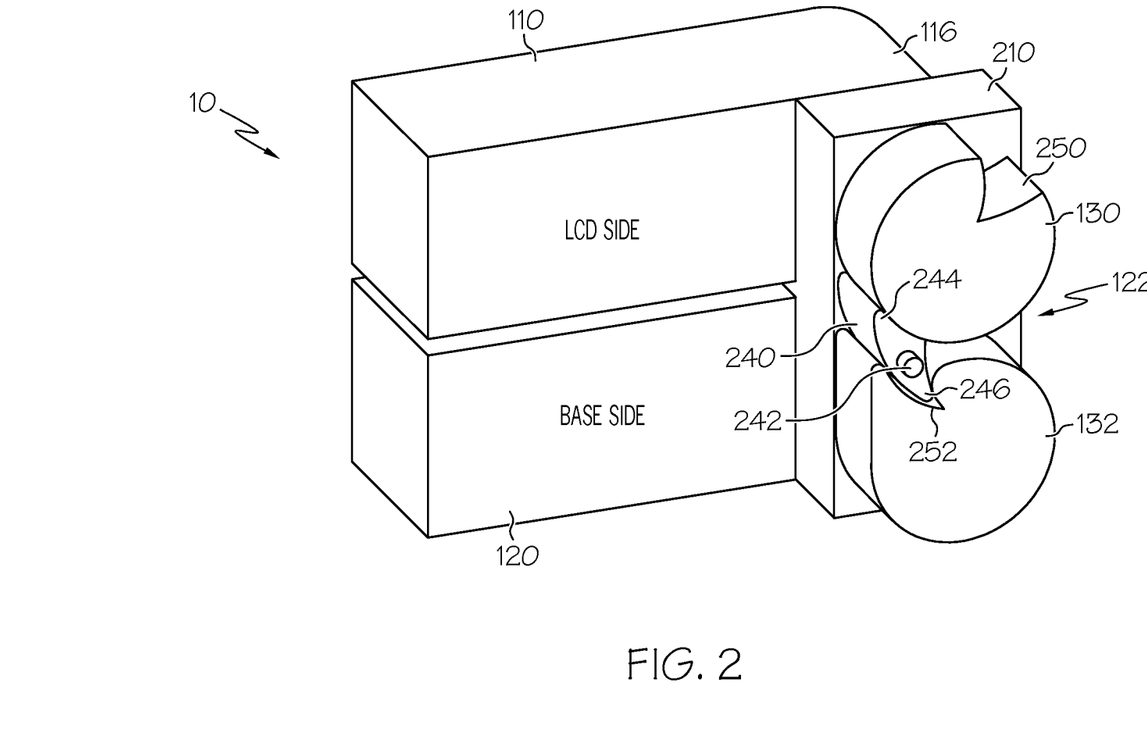
FIG. 2 is a close-up view of the hinge of a tablet personal computer of FIG. 1 with a hinge according to an exemplary embodiment.

Referring to FIG. 2, each of the hinges 122 may include a hinge block 210 and an inhibitor stopper 240. The hinge block 210 may be connected to a first hinge member 130 and a second hinge member 132. The hinge block 210 may be sandwiched between the upper housing 110 and the first hinge member 130; and between the lower housing 120 and the second hinge member 132. The inhibitor stopper 240 may include a first wing 244 and a second wing 246. The inhibitor stopper 240 may be attached to the hinge block 210. The first wing 244 and the second wing 246 may be rotatable around the axis 242.

Still in FIG. 2, the first hinge member 130 may include a first notch 250 at the outer perimeter of the first hinge member 130. The second hinge member 132 may include a second notch 252 at the outer perimeter of the second hinge member 132. The first notch 250 may be shaped in such a way that the first wing 244 of the inhibitor stopper 240 may fit into the first notch 250 of the first hinge member 130. Similarly, the second notch 252 may be shaped in such a way that the second wing 246 of the inhibitor stopper 240 may fit into the second notch 252 of the second hinge member 132.

Figure 3A:
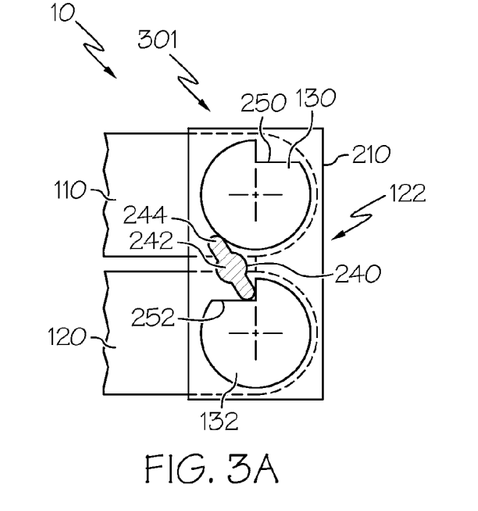
FIG. 3A is a cross-sectional view of the hinge of the tablet personal computer of FIG. 1 according to an exemplary embodiment in a first exemplary position during movement between a laptop configuration and a tablet configuration.
Figure 3B:
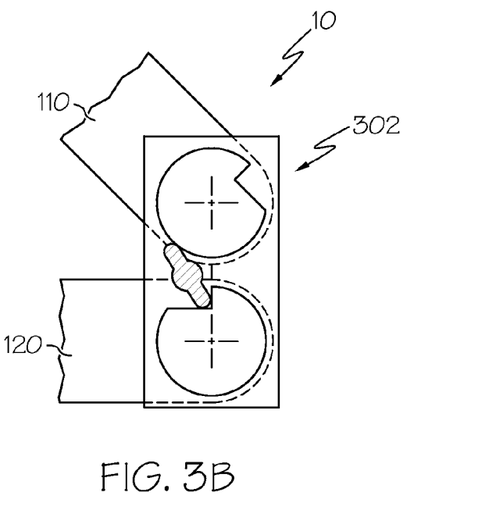
FIG. 3B is a cross-sectional view of the hinge of the tablet personal computer of FIG. 1 according to an exemplary embodiment in a second exemplary position during movement between a laptop configuration and a tablet configuration.
Figure 3C:
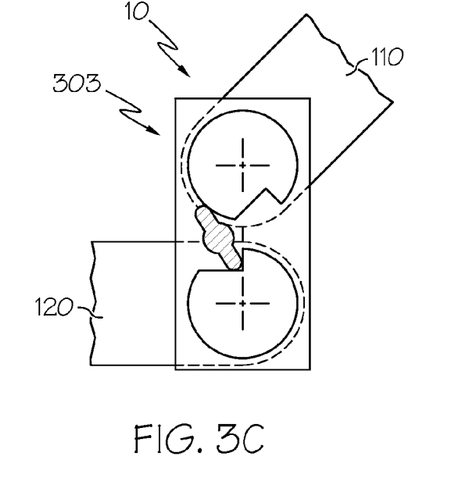
FIG. 3C is a cross-sectional view of the hinge of the tablet personal computer of FIG. 1 according to an exemplary embodiment in a third exemplary position during movement between a laptop configuration and a tablet configuration.
Figure 3D:
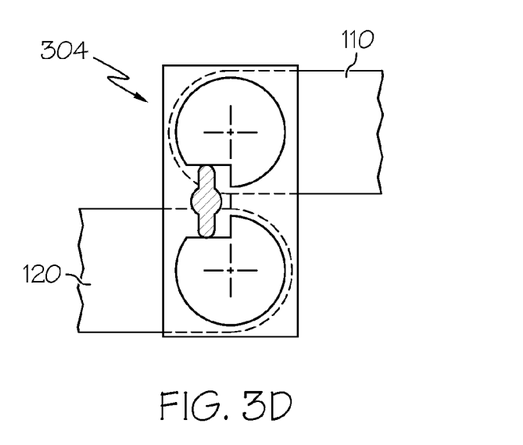
FIG. 3D is a cross-sectional view of the hinge of the tablet personal computer of FIG. 1 according to an exemplary embodiment in a fourth exemplary position during movement between a laptop configuration and a tablet configuration.
Figure 3E:
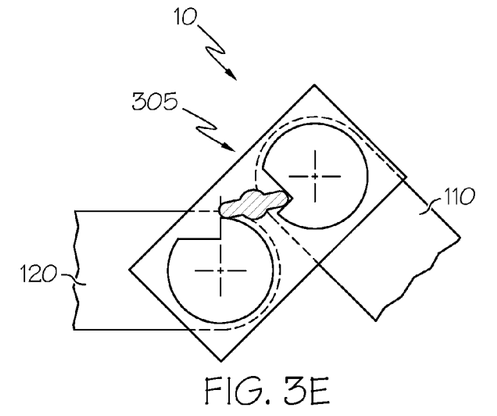
FIG. 3E is a cross-sectional view of the hinge of the tablet personal computer of FIG. 1 according to an exemplary embodiment in a fifth exemplary position during movement between a laptop configuration and a tablet configuration.
Figure 3F:
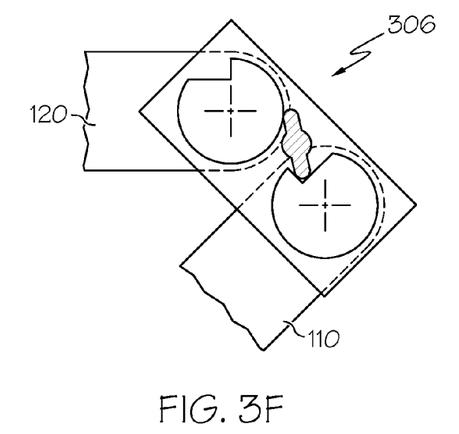
FIG. 3F is a cross-sectional view of the hinge of the tablet personal computer of FIG. 1 according to an exemplary embodiment in a sixth exemplary position during movement between a laptop configuration and a tablet configuration.
Figure 3G:
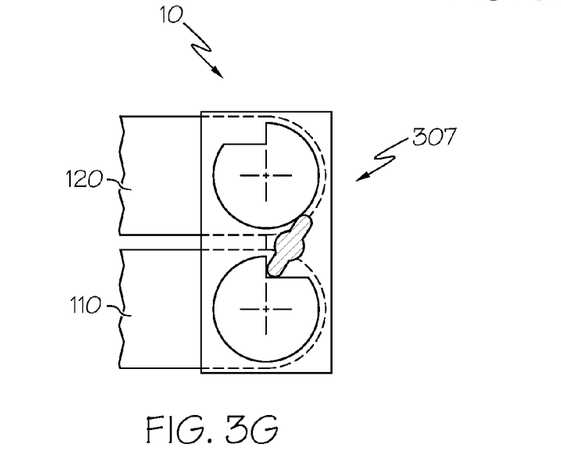
FIG. 3G is a cross-sectional view of the hinge of the tablet personal computer of FIG. 1 according to an exemplary embodiment in a seventh exemplary position during movement between a laptop configuration and a tablet configuration.

In operation of an exemplary embodiment, FIGS. 3A-3G show diagrams of modes of operation for converting a notebook PC 10 from a closed configuration 301 (FIG. 3A), via a laptop configuration 303 (FIG. 3C), to a tablet configuration 307 (FIG. 3G). The tablet PC 10 may change configurations in ways other than those shown in FIGS. 3A-3E, such as from a tablet configuration to a laptop configuration, for example.

It will be understood that the upper housing 110 may pivot relative to the lower housing 120 using both the first hinge member 130 and the second hinge member 132. The first hinge member 130 may operate during a first range of motion, such as rotation of the first housing 110 relative to the second housing 120 from zero degrees (FIG. 3A) to 180 degrees (FIG. 3D). The second hinge member 132 may operate during a second range of motion, such as rotation of the first housing 110 relative to the second housing 120 from 180 degrees (FIG. 3D) to 360 degrees (FIG. 3G).

When converting the notebook PC 10 from a closed configuration to a tablet configuration, the second range of motion directly follows the first range of motion, where at least one of the first and second hinge members 130, 132 is restricted at a given time by the inhibitor stopper 240. Correspondingly, only the first hinge member 130, or the second hinge member 132, may rotate relative to the hinge block 210 at one time. Those skilled in the art may appreciate, of course, that the terms first hinge member and second hinge member may be used broadly herein to refer either to a hinge member on a single hinge, or to hinge members on a series of hinges which define a single hinge axis.

As shown in mode of operation 301 of FIG. 3A, the notebook PC 10 is in a closed configuration. To convert the notebook PC 10 from a closed configuration to a tablet configuration, users may open the first housing 110 to a certain angle as shown in FIG. 3B of mode of operation 302. The first housing 110 and the first hinge member 130 may pivot on the hinge block 210, with the hinge block 210 remaining fixed relative to the lower housing 120, with the second wing 246 of the inhibitor stopper 240 preventing the second hinge member 132 from rotating. If a user wants to use the notebook PC 10 in a laptop configuration 303, the upper housing may be further opened as shown in FIG. 3C. In the laptop configuration of operation 303, the user may sit in front of a desk with the notebook PC 10 on the desk or on their laps, for example.

The user may further rotate the first housing 110 up to substantially 180 degrees relative to the lower housing 120 to achieve mode of operation 304 as shown in FIG. 3D, where the first wing 244 of the inhibitor stopper 240 may engage the notch 250 of the first hinge 130 and prevent the first hinge member 130 from further rotation. When the user wishes to use the notebook PC 10 as a tablet, the user may further rotate the first housing 110 relative to the lower housing 120 to achieve modes of operation 305 and 306 as shown in FIGS. 3E-3F. The first housing 110, together with the hinge block 210, may rotate about the second hinge member 132 while the first wing 244 of the inhibitor 240 may prevent the first hinge member 130 from rotating.

The first housing 110 may further rotate about the second hinge member 132 to achieve a tablet configuration 307. In the tablet configuration 307, the upper housing 110 may be substantially parallel and adjacent to the lower housing 120. Users may use the notebook PC 10 in the tablet configuration 307 while sitting in a car, a train, a subway, or an airplane, for example.

Reversely, the lower housing 110 may rotate about the second hinge member 132 and then the first hinge member 130 to change the notebook PC 10 from the tablet configuration 307 of FIG. 3G to the original closed position as shown in FIG. 3A.

It should be understood, of course, that the foregoing relate to exemplary embodiments of the invention and that modifications may be made without departing from the spirit and scope of the invention as set forth in the following claims.

We claim:

1. A hinge, comprising:
   a hinge block having a first hinge member and a second hinge member; and
   an inhibitor stopper disposed between the first hinge member and the second hinge member, wherein the inhibitor stopper has a first wing and a second wing, wherein the inhibitor stopper is attached to the hinge block, and wherein the first and second wings are rotatable around an axis;
   wherein the first hinge member has a first notch at an outer perimeter of the first hinge member and the second hinge member has a second notch at an outer perimeter of the second hinge member;
   wherein the first hinge member is adapted to attach to a first housing;
   wherein the second hinge member is adapted to attach to a second housing;
   wherein the second wing of the inhibitor stopper engages the second notch to prevent the second hinge member from rotating when the first hinge member rotates from zero degrees to 180 degrees.

2. The hinge of claim 1, wherein the first housing is rotatable on the hinge block.

3. The hinge of claim 1, wherein the hinge block is rotatable on the first hinge member and second hinge member.

4. The hinge of claim 1, wherein the first wing of the inhibitor stopper engages the first notch to prevent the first hinge member from rotating when the first housing rotates from 180 degrees to 360 degrees.

5. The hinge of claim 1, wherein the hinge is connected to confronting edge portions of the first housing and the second housing.

6. The hinge of claim 1, wherein multiple hinges are disposed along confronting edge portions of the first housing and the second housing.

7. An electronic computing device, comprising:
   a lower housing;
   an upper housing; and
   a plurality of hinge blocks attached to confronting edge portions of the lower housing and the upper housing, wherein each of the hinge blocks has an inhibitor stopper, wherein the inhibitor stopper is operatively coupled to the lower housing and the upper housing in such a way that the upper housing is rotatable synchronously over substantially 360° with respect to the lower housing on the plurality of hinge blocks.

8. The electronic computing apparatus of claim 7, wherein the lower housing has an input device.

9. The electronic computing apparatus of claim 7, wherein the upper housing comprises a touch sensitive screen.

10. The electronic computing apparatus of claim 7, wherein the plurality of hinge blocks includes a first hinge member and a second hinge member, wherein the first hinge members are connected to the upper housing and the second hinge members are connected to the lower housing.

11. The electronic computing apparatus of claim 10, wherein the inhibitor stopper is disposed between the first hinge and the second hinge.

* * * * *